(12) United States Patent
Wang

(10) Patent No.: US 11,435,644 B2
(45) Date of Patent: Sep. 6, 2022

(54) GLASSES AND RELATED METHOD FOR IMAGE PROCESSING

(71) Applicant: Lenovo (Beijing) Co., Ltd., Beijing (CN)

(72) Inventor: Yilun Wang, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 120 days.

(21) Appl. No.: 16/817,354

(22) Filed: Mar. 12, 2020

(65) Prior Publication Data
US 2020/0292907 A1 Sep. 17, 2020

(30) Foreign Application Priority Data
Mar. 12, 2019 (CN) .......................... 201910185806.5

(51) Int. Cl.
G02F 1/15 (2019.01)
G02F 1/03 (2006.01)
(Continued)

(52) U.S. Cl.
CPC ................................... G02F 1/163 (2013.01)

(58) Field of Classification Search
CPC ......... C09K 9/02; B43L 13/18; H04N 9/3197; G02C 5/00; G02C 7/04; G02C 7/02; A61B 3/103; A61B 3/14; A61B 3/113; A61B 3/1225; A61B 3/024; G02F 1/155; G02F 1/03; G02F 1/1523; G02F 1/1525; G02F 1/1521; G02F 1/1533; G02F 1/02; B60R 1/088; B82Y 20/00; G02B 27/0103; G02B 27/0172; G02B 27/0149; G02B 27/145; G02B 27/143

USPC .......... 359/265–275, 13, 277, 245–247, 242, 359/630–636; 345/49, 105; 351/41, 205, 351/206, 209, 210, 221, 222, 159.01, 351/159.74–159.76
See application file for complete search history.

(56) References Cited

U.S. PATENT DOCUMENTS

2009/0103044 A1* 4/2009 Duston .................... G02C 5/02
351/159.01
2016/0055822 A1* 2/2016 Bell ......................... G09G 5/10
345/207
2017/0323615 A1* 11/2017 Hazra .................... G09G 3/002

FOREIGN PATENT DOCUMENTS

CN 102854689 A 1/2013
CN 103903000 A 7/2014
(Continued)

Primary Examiner — Dawayne Pinkney
(74) Attorney, Agent, or Firm — Anova Law Group, PLLC

(57) ABSTRACT

A pair of glasses is disclosed. The glasses include a lens made of electrochromic glass; a camera for capturing a foreground image; an infrared sensor circuit for emitting an infrared light, receiving the infrared light reflected by a target object in the foreground image, and determining an emitting time for emitting the infrared light and a receiving time for receiving the reflected infrared light; and a processing circuit for obtaining information of an area of the target object based on the foreground image, the emitting time, and the receiving time, and controlling a change of a voltage applied to the corresponding area based on the information of the corresponding area; a battery for supplying the voltage applied to the corresponding area at the lens to change the voltage applied; and a frame for accommodating the lens, the camera, the infrared sensor circuit, the processing circuit, and the battery.

13 Claims, 9 Drawing Sheets

(51) Int. Cl.
*G02F 1/153* (2006.01)
*G02B 27/14* (2006.01)
*G09G 3/19* (2006.01)
*G09G 3/38* (2006.01)
*G02F 1/163* (2006.01)

(56) References Cited

FOREIGN PATENT DOCUMENTS

| | | |
|---|---|---|
| CN | 106353947 A | 1/2017 |
| CN | 106662747 A | 5/2017 |
| CN | 107608080 A | 1/2018 |
| CN | 206946130 U | 1/2018 |
| CN | 107991821 A | 5/2018 |

* cited by examiner

GLASSES AND RELATED METHOD FOR IMAGE PROCESSING

CROSS-REFERENCES TO RELATED APPLICATIONS

This application claims the priority of Chinese Patent Application No. 201910185806.5, filed on Mar. 12, 2019, the entire content of which is incorporated herein by reference.

FIELD OF THE DISCLOSURE

The present disclosure generally relates to the field of image processing and, more particularly, relates to a pair of glasses and an image processing method.

BACKGROUND

With the development of mobile devices, the need for creating an immersive space in a public environment gradually increases. However, the existing virtual reality (VR) devices are usually cumbersome to wear. On the other hand, mixed reality (MR) devices capturing live images through a camera are difficult to use due to their bulky size and performance limitations of the cameras. The existing augmented reality (AR) devices are also lacking immersive experiences in their designs.

BRIEF SUMMARY OF THE DISCLOSURE

One aspect of the present disclosure provides a pair of glasses. The pair of glasses includes a lens made of electrochromic glass; a camera for capturing a foreground image; an infrared sensor circuit for emitting an infrared light, receiving the infrared light reflected by a target object in the foreground image, and determining an emitting time for emitting the infrared light and a receiving time for receiving the reflected infrared light; a processing circuit for obtaining information of an area at the lens corresponding to the target object based on the foreground image, the emitting time, and the receiving time, and controlling a change of a voltage applied to the corresponding area at the lens based on the information of the corresponding area; a battery for supplying the voltage applied to the corresponding area at the lens to change the voltage applied to the corresponding area; and a frame for accommodating the lens, the camera, the infrared sensor circuit, the processing circuit, and the battery.

Another aspect of the present disclosure provides an image processing method for a pair of glasses. The method includes: using a camera of the glasses to capture a foreground image; using an infrared sensor circuit of the glasses to emit an infrared light, receive the infrared light reflected by a target object in the foreground image, and determine an emitting time for emitting the infrared light and a receiving time for receiving the reflected infrared light; based on the foreground image, the emitting time, and the receiving time, obtaining information of an area at a lens of the glasses corresponding to the target object, wherein the lens is made of electrochromic glass; and based on the information of the area, changing a voltage applied to the corresponding area at the lens.

Another aspect of the present disclosure provides a VR device. The VR device includes a lens made of electrochromic glass; a camera for capturing a foreground image; an infrared sensor circuit for emitting an infrared light, receiving the infrared light reflected by a target object in the foreground image, and determining an emitting time for emitting the infrared light and a receiving time for receiving the reflected infrared light; a processing circuit for obtaining information of an area at the lens corresponding to the target object based on the foreground image, the emitting time, and the receiving time, and controlling a change of a voltage applied to the corresponding area at the lens based on the information of the corresponding area; a battery for supplying the voltage applied to the corresponding area at the lens to change the voltage applied to the corresponding area; and a frame for accommodating the lens, the camera, the infrared sensor circuit, the processing circuit, and the battery.

Other aspects of the present disclosure can be understood by those skilled in the art in light of the description, the claims, and the drawings of the present disclosure.

BRIEF DESCRIPTION OF THE DRAWINGS

In the drawings (not necessarily drawn to scale), similar reference numerals may describe similar components in different views. Similar reference numerals with different letter suffixes may represent different examples of similar components. The drawings are intended to be exemplary and not restrictive for illustrating the various embodiments discussed herein.

DETAILED DESCRIPTION

To make the foregoing objectives, features and advantages of the present disclosure clearer and more understandable, the present disclosure will be further described with reference to the accompanying drawings and embodiments. The attached drawings are for reference only and are not intended to limit the present disclosure.

For convenience of explanation, when describing the details of the embodiments, parts of cross-sectional views illustrating component structures may be disproportionally enlarged. The drawings are intended to be illustrative and not restrictive. In addition, actual implementation should include three-dimensional sizes of length, width and depth.

Figure 1:
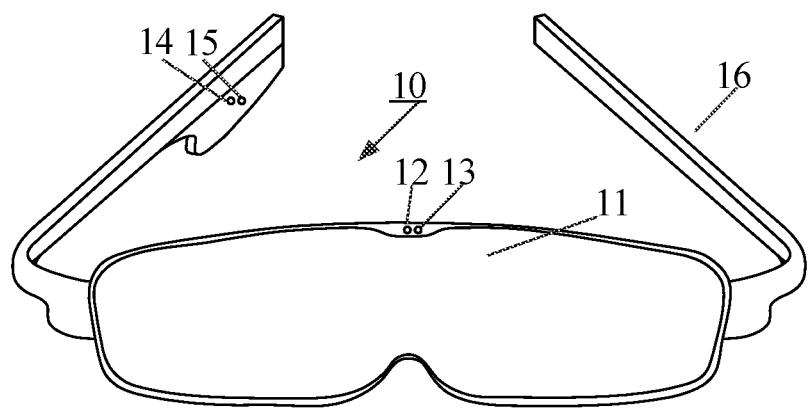
FIG. 1 illustrates a schematic diagram of an example of a pair of glasses according to some embodiments of the present disclosure.

In the present disclosure, a VR device may refer to any type of AR device, MR device, and any device that can provide a simulated experience that can be similar to or completely different from the real world. One embodiment of the present disclosure provides a pair of glasses. FIG. 1 illustrates a schematic diagram of an example of a pair of glasses according to some embodiments of the present disclosure. As shown in FIG. 1, the pair of glasses 10 (referred to as glasses hereinafter) includes a lens 11, a camera 12, an infrared sensor circuit 13, a processing circuit 14, a battery 15, and a frame 16.

The camera 12 and the infrared sensor circuit 13 are disposed on the lens 11. In general, the camera 12 or the infrared sensor circuit 13 may be disposed at the center of the lens 11. The camera 12 or the infrared sensor circuit 13 may also be disposed at two sides of the lens 11. The locations of the camera 12 and the infrared sensor circuit 13 are not limited by the present disclosure.

The processing circuit 14 and the battery 15 are disposed on the frame 16. For example, the processing circuit 14 and the battery 15 may be disposed on any one of the two temples. The locations of the processing circuit 14 and the battery 15 are not limited by the present disclosure.

The lens 11 is made of electrochromic glass, capable of reversibly change colors under the influence of an applied electric field. The electrochromic glass is a new type of material changing colors. When substantially low driving voltage and current are applied, the electric field triggers an electrochemical redox reaction to cause the optical transmission characteristics of the glass to change, thereby causing color change. For example, the electrochromic glass changes the color from opaque to transparent. In the present disclosure, the glass being opaque refers to the glass being colors that transmit no light, and therefore reflect, scatters, or absorbs all of it, such as the glass being black.

The camera 12 is configured to collect a foreground image. The foreground image is the image captured by the camera in front of the camera.

When the glasses 10 moves, the camera 12 captures the foreground image during the movement of the glasses 10 and sends the captured foreground image to the processing circuit 14. After the captured foreground image is sent to the processing circuit 14, the processing circuit 14 processes the received foreground image.

The infrared sensor circuit 13 is configured to emit an infrared light and receive the infrared light reflected by a target object in the foreground image. The time emitting the infrared light is determined to be the emitting time of the infrared light and the time receiving the reflected infrared light is determined to be the receiving time of the reflected infrared light. In one embodiment, it is necessary to record the emitting time of the infrared light and the receiving time of the reflected infrared light. Then, the infrared sensor circuit 13 sends the recorded emitting time and receiving time to the processing circuit 14. After the recorded emitting time and receiving time are sent to the processing circuit 14, the processing circuit 14 processes the recorded emitting time and receiving time. In one embodiment, the infrared sensor circuit 14 is disposed adjacent to the camera 12. In another embodiment, the infrared sensor circuit 13 is disposed at a location separated from the camera 12 by a pre-determined distance.

The processing circuit 14 is configured to obtain information of an area where the target object in the foreground image is located based on the foreground image, the emitting time, and the receiving time, and to control change of the voltage applied to a corresponding area of the lens 11 based on the obtained information of the area.

In practical applications, the processing circuit 14 analyzes the foreground image to determine the target object in the foreground image. Using the obtained emitting time and receiving time, the processing circuit 14 is able to determine distance information between the target object and the glasses. Using the principle of imaging, the processing circuit 14 performs a calculation on the target object and the distance information between the target object and the glasses to obtain the information of the area at the lens corresponding to the target object. The information of the area includes: a target area and voltage information corresponding to the target area. The target area is a position at the lens 11 corresponding to the target object.

The battery 15 is configured to supply a voltage to a corresponding area at the lens 11, such that the voltage applied to the corresponding area at the lens 11 changes to make the corresponding area transparent. Thus, a user is able to see the target object through the corresponding area at the lens 11. In some embodiments, the battery 15 may also supply power to the camera 12.

The frame 16 is configured to accommodate the lens 11, the camera 12, the infrared sensor circuit 13, the processing circuit 14, and the battery 15. In one embodiment, the frame 16 is made of a rigid material. The frame 16 may be made of a material that is acid-resistant, heat-resistant, shock-resistant, substantially insulative, and has desired mechanical properties.

The glasses provided in the embodiments of the present disclosure includes the lens, the camera, the infrared sensor circuit, the processing circuit, the battery, and the frame. The processing circuit processes the foreground image captured by the camera, and the emitting time and the receiving time determined by the infrared sensor circuit to obtain the information of the area. Based on the information of the area, the processing circuit controls the change of the voltage applied to the corresponding area at the lens to make the user see the target object. Thus, the user experiences the immersive effect while the glasses is small in size and convenient to carry.

Figure 2:
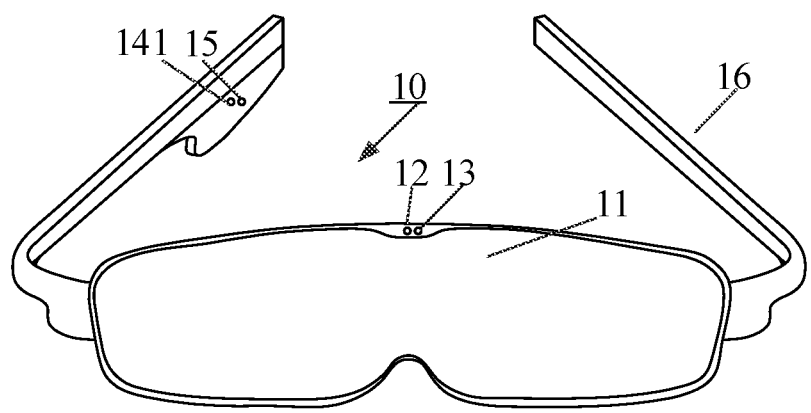
FIG. 2 illustrates a schematic diagram of another example of a pair of glasses according to some embodiments of the present disclosure.

The present disclosure also provides another glasses. As shown in FIG. 2, the glasses 10 includes: the lens 11, the camera 12, the infrared sensor circuit 13, a communication circuit 141, the battery 15, and the frame 16. The lens 11 is made of electrochromic glass.

The camera 12 is configured to capture the foreground image.

The infrared sensor circuit 13 is configured to emit the infrared light and receive the infrared light reflected by the target object in the foreground image, and to determine the emitting time for emitting the infrared light and the receiving time for receiving the reflected infrared light.

The communication circuit 141 is configured to send the foreground image, the emitting time, and the receiving time to a terminal associated with the glasses and to receive the information of the area sent by the associated terminal.

In this case, the terminal associated with the glasses may be a mobile phone, a computer, etc.

In one embodiment, the glasses 10 does not include a processor. The processing circuit 14 in the glasses 10 only includes the communication circuit 141. The communication circuit 141 only sends the foreground image, the emitting time, and the receiving time to the terminal associated with the glasses, for example, the mobile phone, without processing the foreground image, the emitting time, and the receiving time. The terminal associated with the glasses processes the foreground image, the emitting time, and the receiving time to obtain the information of the area. The terminal associated with the glasses sends the information of the area to the communication circuit 141.

The battery 15 is configured to supply the voltage to the corresponding area at the lens 11 to change the voltage applied to the corresponding area at the lens.

The frame 16 is configured to accommodate the lens 11, the camera 12, the infrared sensor circuit 13, the communication circuit 141, and the battery 15.

The glasses provided in the embodiments of the present disclosure includes the lens, the camera, the infrared sensor circuit, the communication circuit, the battery, and the frame. The communication circuit sends the foreground image captured by the camera, and the emitting time and the receiving time determined by the infrared sensor circuit to the terminal associated with the glasses. The terminal associated with the glasses processes them to obtain the information of the area. Based on the information of the area, the communication circuit controls the change of the voltage applied to the corresponding area at the lens to make the user see the target object. Thus, the user experiences the immersive effect while the glasses is small in size and convenient to carry.

Figure 3:
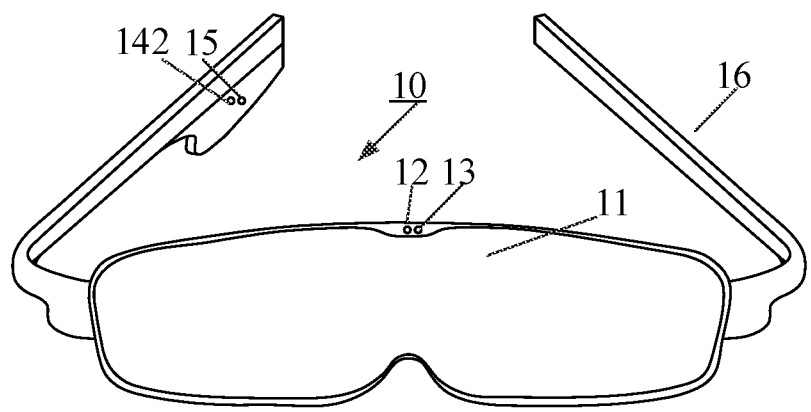
FIG. 3 illustrates a schematic diagram of another example of a pair of glasses according to some embodiments of the present disclosure.

The present disclosure also provides another glasses. As shown in FIG. 3, the glasses 10 includes: the lens 11, the camera 12, the infrared sensor circuit 13, a processor 142, the battery 15, and the frame 16. The lens 11 is made of electrochromic glass.

The camera 12 is configured to capture the foreground image.

The infrared sensor circuit 13 is configured to emit the infrared light, receive the infrared light reflected by the target object in the fore ground image, and determine the emitting time for emitting the infrared light and the receiving time for receiving the reflected infrared light.

The processor 142 is configured to process the foreground image to obtain contour information of an object in the foreground image, and to compare the contour information of the object in the foreground image with a pre-set contour information to obtain the target object in the foreground image.

The processor 142 is further configured to determine the distance information of the target object based on the emitting time and the receiving time, and to determine the information of the area at the lens corresponding to the target object based on the contour information and the distance information.

In one embodiment, the glasses 10 includes the processor 142. The processor 142 processes the foreground image, the emitting time, and the receiving time to obtain the information of the area at the lens corresponding to the target object.

In practical applications, the processor 142 processes the foreground image to obtain the contour information of the object in the foreground image and compares the contour information of the object in the foreground image with the pre-set contour information. In response to the contour information of the object substantially consistent with the pre-set contour information, the object is determined to be the target object.

The processor 142 performs calculation on the emitting time and the receiving time to determine the distance information between the target object and the glasses. In some embodiments, when the target object and the distance information of the glasses are determined, a time difference ΔT between the emitting time and the receiving time is often determined, and then the distance information D between the target object and the glasses is calculated by the following equation:

$$D = \Delta T * C / 2$$

where C is the speed of light.

Based on the contour information and the distance information of the target object, the processor 142 determines the information of the area at the lens 11 corresponding to the target object based on the principle of imaging.

The battery 15 is configured to supply the voltage applied to the corresponding area at the lens 11 to change the voltage applied to the corresponding area of the lens 11.

The frame 16 is configured to accommodate the lens 11, the camera 12, the infrared sensor circuit 13, the processor 142, and the battery 15.

In the glasses provided in the embodiments of the present disclosure, the processor determines the target object by comparing the contour information in the foreground image with the pre-set contour information, and determines the distance information of the target object. Based on the contour information and the distance information of the target object, the processor uses the principle of imaging to determine the information of the area at the lens corresponding to the target object.

The present disclosure also provides another glasses. As shown in FIG. 1, the glasses 10 includes: the lens 11, the camera 12, the infrared sensor circuit 13, the processing circuit 14, the battery 15, and the frame 16. The lens 11 is made of electrochromic glass.

In the lens 11, different parts of the electrochromic glass correspond to different voltages. In some embodiments, to facilitate the adjustment of the voltage on the lens 11, the lens 11 is divided into a plurality of partitions. In response to a change of the voltage on a partition, the color of the electrochromic glass of the partition changes correspondingly. In response to no change of the voltage on the partition, the color of the electrochromic glass of the partition does not change. In response to the changed voltage crossing a pre-set threshold, the color of the electrochromic glass becomes transparent, such that the user sees the target object through the partition. In response to the changed voltage without crossing the pre-set threshold, the color of the electrochromic glass of the partition remains opaque, such that the user is unable to see objects other than the target object, thereby experiencing the immersive effect.

The camera 12 is configured to capture the foreground image.

The infrared sensor circuit 13 is configured to emit the infrared light, receive the infrared light reflected by the target object in the fore ground image, and determine the emitting time for emitting the infrared light and the receiving time for receiving the reflected infrared light.

The processing circuit 14 is configured to process the foreground image, the emitting time, and the receiving time to obtain the information of the area at the lens corresponding to the target object. Based on the obtained information of the area at the lens 11 corresponding to the target object, the processing circuit 14 controls the change of the voltage applied to the corresponding area.

In some embodiments, the plurality of partitions of the lens 11 includes one or more partitions. Each partition corresponds to a different partition identifier. After the processing circuit obtains the information of the area at the lens corresponding to the target object, the processing circuit uses the foreground image, the emitting time, and the receiving time to obtain the partition identifier corresponding to the target object and to control the change of the voltage applied to the corresponding area of the partition identifier.

The battery 15 is configured to supply the voltage applied to the corresponding area at the lens 11 to change the voltage applied to the corresponding area of the lens 11.

The frame 16 is configured to accommodate the lens 11, the camera 12, the infrared sensor circuit 13, the processing circuit 14, and the battery 15.

The glasses provided in the embodiments of the present disclosure includes the lens, the camera, the infrared sensor circuit, the processing circuit, the battery, and the frame. The lens is divided into the plurality of partitions. Each partition corresponds to a different partition identifier. Based on the determined partition identifier, the processing circuit controls the electrochromic glass of the corresponding partition to be transparent, such that the user sees the target object through the corresponding partition. Alternatively, based on the determined partition identifier, the processing circuit controls the electrochromic glass of the partitions other than the determined partition to remain unchanged, such that the user is unable to see the object other than the target object.

The present disclosure also provides another glasses. As shown in FIG. 1, the glasses 10 includes: the lens 11, the camera 12, the infrared sensor circuit 13, the processing circuit 14, the battery 15, and the frame 16. The lens 11 is made of electrochromic glass.

The camera 12 is configured to capture the foreground image.

The infrared sensor circuit 13 is configured to emit the infrared light, receive the infrared light reflected by the target object in the fore ground image, and determine the emitting time for emitting the infrared light and the receiving time for receiving the reflected infrared light.

The processing circuit 14 is configured to process the information of the area to obtain a target area and voltage information corresponding to the target area. The target area is an area at the lens corresponding to the target object. Based on the information of the area, the processing circuit 14 controls the change of the voltage applied to the target area, such that the color of the electrochromic glass corresponding to the target area becomes transparent. Alternatively, based on the information of the area, the processing circuit 14 controls the voltages applied to the areas other than the target area to remain unchanged, such that the color of the electrochromic glass corresponding to the areas other than the target area remains opaque.

In this case, the information of the area includes: the target area and the voltage information corresponding to the target area. The target area is the area at the lens 11 corresponding to the target object, that is, a area at the lens 11 to which the target object in the foreground image is projected.

For the target area in the information of the area, the processing circuit 14 controls the change of the voltage applied to the target area, such that the color of the electrochromic glass in the target area becomes transparent. Alternatively, for the target area in the information of the area, the processing circuit 14 controls the voltages applied to the areas other than the target area to remain unchanged, such that the color of the electrochromic glass in the areas other than the target area remains unchanged, that is, opaque.

In one embodiment, the battery 15 is further configured to supply power to the areas other than the target area at the lens, such that the voltages applied to the areas other than the target area remain unchanged.

The battery 15 is further configured to supply power to the areas other than the target area at the lens, such that the voltages applied to the areas other than the target area remain unchanged. Thus, the color of the electrochromic glass in the areas other than the target area remains opaque, thereby achieving the immersive experience effect.

The battery 15 is configured to supply the voltage applied to the corresponding area at the lens 11 to change the voltage applied to the corresponding area at the lens 11.

The frame 16 is configured to accommodate the lens 11, the camera 12, the infrared sensor circuit 13, the processing circuit 14, and the battery 15.

In the glasses provided in the embodiments of the present disclosure, the processing circuit processes the foreground image captured by the camera, and the emitting time and the receiving time of the infrared light determined by the infrared sensor circuit to obtain the information of the area. Based on the information of the area, the processing circuit controls the change of the voltage applied to the corresponding area at the lens or controls the voltages applied to the areas other than the target area at the lens to remain unchanged, such that the user sees the target object while experiencing the immersive effect.

Figure 4:
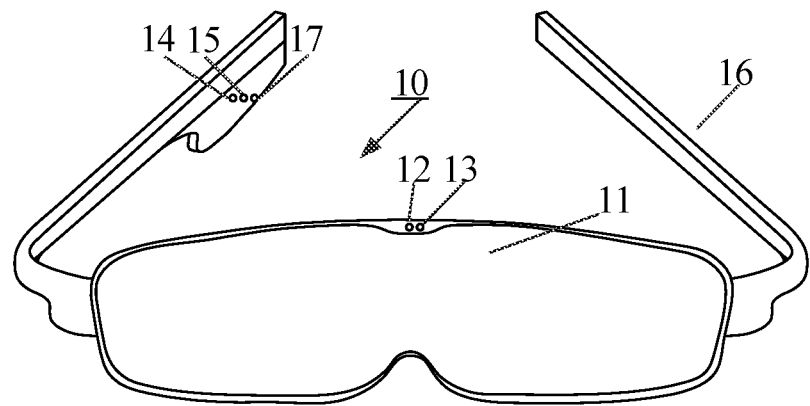
FIG. 4 illustrates a schematic diagram of another example of a pair of glasses according to some embodiments of the present disclosure.

The present disclosure also provides another glasses. As shown in FIG. 4, the glasses 10 includes: the lens 11, the camera 12, the infrared sensor circuit 13, the processing circuit 14, the battery 15, the frame 16, and a memory circuit 17. The lens 11 is made of electrochromic glass.

The camera 12 is configured to capture the foreground image.

The infrared sensor circuit 13 is configured to emit the infrared light, receive the infrared light reflected by the target object in the fore ground image, and determine the emitting time for emitting the infrared light and the receiving time for receiving the reflected infrared light.

The processing circuit 14 is configured to process the foreground image, the emitting time, and the receiving time to obtain the information of the area at the lens corresponding to the target object, and based on the information of the area to control the change of the voltage applied to the corresponding area at the lens 11.

The battery 15 is configured to supply the voltage applied to the corresponding area at the lens to change the voltage applied to the corresponding area at the lens.

The memory circuit 17 is disposed on the frame 16. The memory circuit 17 may be disposed on any one of the two temples of the frame 16. The position of the memory circuit 17 is not limited by the present disclosure.

The memory circuit 17 is configured to store the foreground image sent from the camera 12 or the emitting time for emitting the infrared light and the receiving time for receiving the reflected infrared light sent from the infrared sensor circuit 13.

The camera 12 sends the captured foreground image to the memory circuit 17. After the captured foreground image is sent to the memory circuit 17, the memory circuit 17 stores the captured foreground image. In response to the need for processing by the processing circuit 14, the memory circuit 17 sends the stored foreground image to the processing circuit 14.

The infrared sensor circuit 13 sends the recorded emitting time and receiving time to the memory circuit 17. After the recorded emitting time and receiving time is sent to the memory circuit 17, the memory circuit 17 stores the recorded emitting time and receiving time. In response to the need for processing by the processing circuit 14, the memory circuit 17 sends the recorded emitting time and receiving time to the processing circuit 14.

The glasses provided in the embodiments of the present disclosure includes the lens, the camera, the infrared sensor circuit, the processing circuit, the battery, the frame, and the memory circuit. The memory circuit stores the captured foreground image, and the determined emitting time and receiving time. In response to the need for process by the processing circuit, the memory circuit sends the foreground image, the emitting time, and the receiving time to the processing circuit.

The embodiments of the present disclosure use specific application scenes as examples to describe how the glasses provided in the embodiments achieves the immersive experience effect.

Figure 5A:
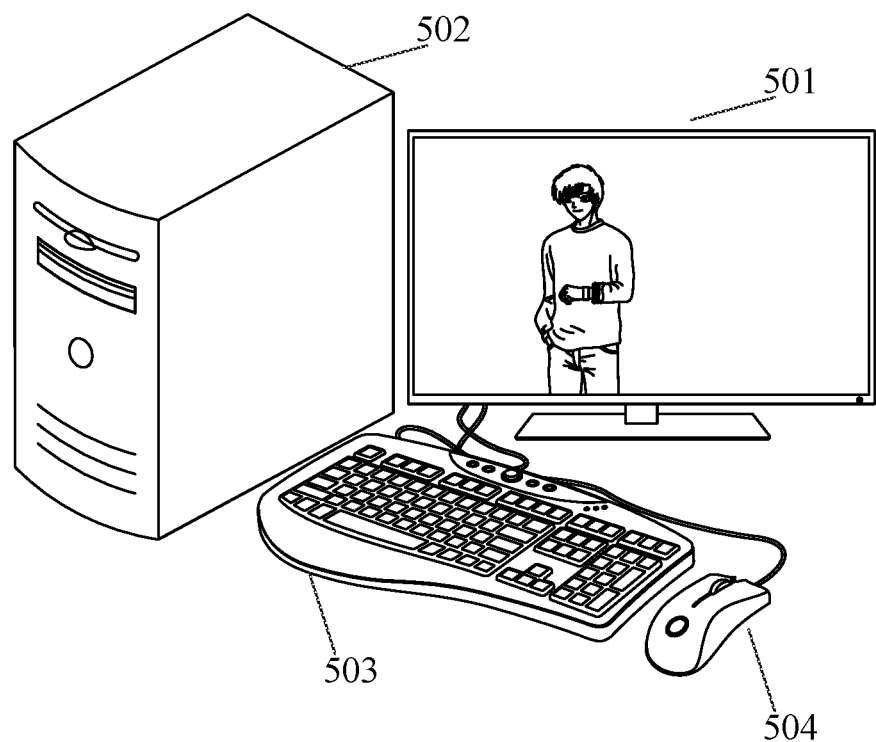
FIG. 5A illustrates a schematic diagram of a foreground image of an office scene according to some embodiments of the present disclosure.
Figure 5B:
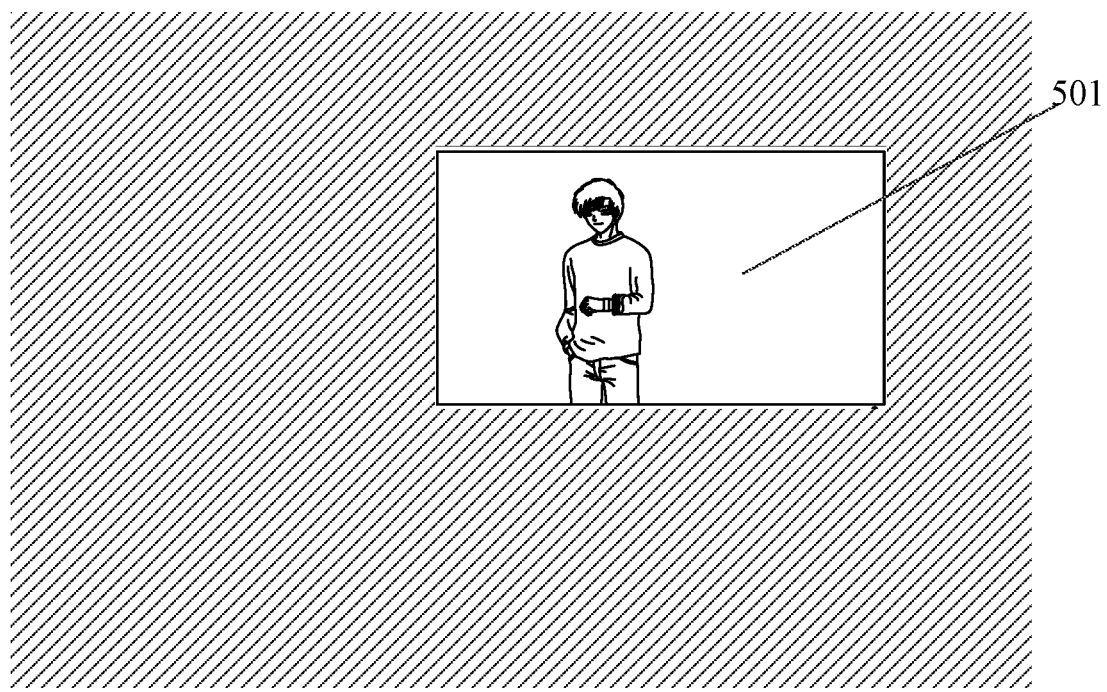
FIG. 5B illustrates a schematic diagram of an effect of seeing a computer screen through a pair of glasses according to some embodiments of the present disclosure.

FIG. 5A illustrates a schematic diagram of a foreground image of an office scene according to some embodiments of the present disclosure. As shown in FIG. 5A, the foreground image includes: a computer screen 501, a computer host 502, a keyboard 503, and a mouse 504. The computer screen 501 in the foreground image of the office scene is selected as the target object. The voltage applied to the area at the lens corresponding to the target object is changed, such that the user sees the computer screen through the glasses and does not see anything other than the computer screen, thereby experiencing the immersive effect. The view the user sees the computer screen 501 through the glasses is shown in FIG. 5B.

In some embodiments, the computer screen in the office application scene us selected as the target object. The user sees only the computer screen and nothing else, thereby experiencing the immersive effect.

Under the circumstance that the glasses 10 does not include the processor and only includes the communication circuit, the glasses 10 and the terminal associated with the glasses 10 have to be used together. In the embodiments of the present disclosure, a mobile phone is used as an example of the associated terminal to describe coordination between the glasses and the mobile phone in achieving the immersive effect.

The glasses may be connected with hand-held devices such as the mobile phone. The camera of the glasses captures the foreground image. The infrared sensor circuit determined the emitting time for emitting the infrared light and the receiving time for receiving the reflected infrared light. The glasses send the foreground image, the emitting time, and the receiving time to the mobile phone through the communication circuit. The processor of the mobile phone processes the collected data to determine the position at the lens of the glasses corresponding to the target object and change the voltage accordingly, thereby achieving the immersive experience effect.

Figure 6A:
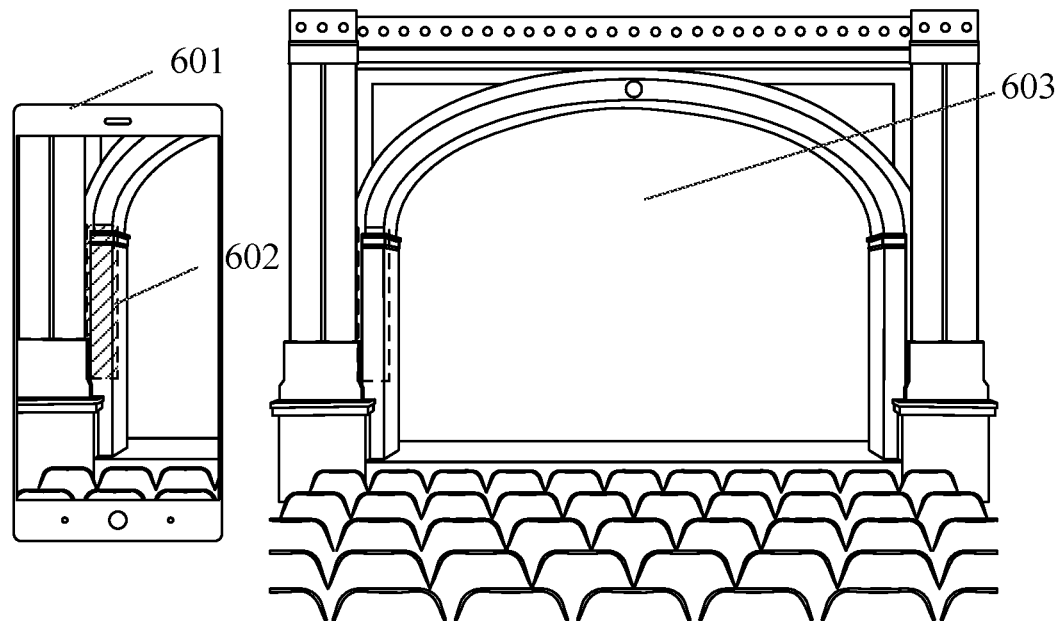
FIG. 6A illustrates a schematic diagram of an effect of selecting a target object according to some embodiments of the present disclosure.
Figure 6B:
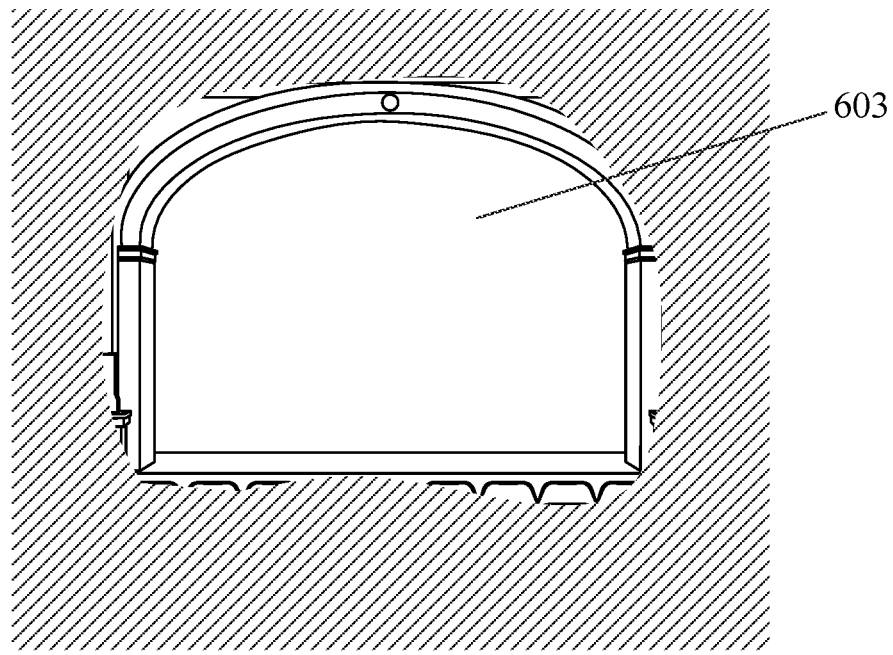
FIG. 6B illustrates a schematic diagram of an effect of associating a pair of glasses with a mobile phone to achieve an immersive experience according to some embodiments of the present disclosure.

For example, FIG. 6A illustrates a schematic diagram of an effect of selecting a target object according to some embodiments of the present disclosure. The mobile phone 601 captures objects in a first fireground image to generate the first foreground image. The user operates to select a particular object from the objects in the first foreground image as a marked object 602. The mobile phone 601 processes the first foreground image to obtain the contour information of the marked object 602 and saves the contour information of the marked object 602 as the pre-set contour information. The camera of the glasses captures a second foreground image and sends the second foreground image to the mobile phone 601 through the communication circuit. The processor of the mobile phone 601 processes the second foreground image to obtain the contour information of the objects in the second foreground image and compares the contour information with the pre-set contour information to obtain the target object 603. The infrared sensor circuit determines the emitting time and the receiving time with respect to the target object 503, and sends the emitting time and the receiving time to the mobile phone 601 through the communication circuit. The processor of the mobile phone 601 performs the calculation to obtain the distance information between the target object 603 and the glasses. Based on the contour information and the distance information of the target object 603, and the principle of imaging, the processor of the mobile phone 601 determines the information of the area at the lens corresponding to the target object 603 and send the information of the area to the communication circuit of the glasses. Based on the information of the area, the processing circuit of the glasses controls the battery to change the voltage applied to the area corresponding to the target object 603, such that the target area at the lens becomes transparent. Thus, the user is able to see the target object 603 through the corresponding area at the lens. The display effect is shown in FIG. 6B.

In the embodiments of the present disclosure, the marked object fixed in a scene is tracked. As the user moves, a corresponding viewing area is activated, thereby experiencing the immersive effect and achieving image tracking and recognition.

Figure 7:
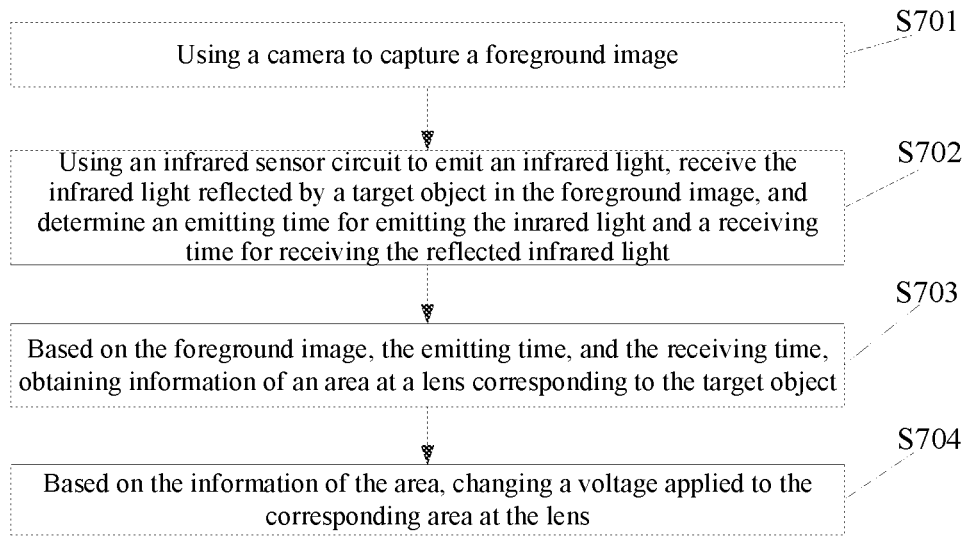
FIG. 7 illustrates a flowchart of an example of an image processing method according to some embodiments of the present disclosure.

The present disclosure also provides an image processing method. FIG. 7 illustrates a flowchart of an example of an image processing method according to some embodiments of the present disclosure. As shown in FIG. 7, the image processing method includes the following process.

At S701, a foreground image is captured by a camera.

At S702, an infrared sensor circuit emits an infrared light, receives the infrared light reflected by a target object in the foreground image, and determines an emitting time for emitting the infrared light and a receiving time for receiving the infrared light.

At S703, based on the foreground image, the emitting time, and the receiving time, information of an area at a lens corresponding to the target object is obtained.

At S704, based on the information of the area, a voltage applied to the corresponding area at the lens is changed.

The image processing method provided in the embodiments of the present disclosure processes the foreground image captured by the camera, and the emitting time and receiving time of the infrared light determined by the infrared sensor circuit to obtain the information of the area. The information of the area is used to control the battery to change the voltage applied to the corresponding area at the lens, such that the user is able to see the target object, thereby experiencing the immersive effect.

It should be noted that the image processing method provided by the foregoing embodiments shares the same concept as those of the embodiments of the glasses. The implementation details are similar to those of the embodiments of the glasses, and are not repeated herein.

The present disclosure also provides another image processing method. The image processing method includes the following process.

Figure 8:
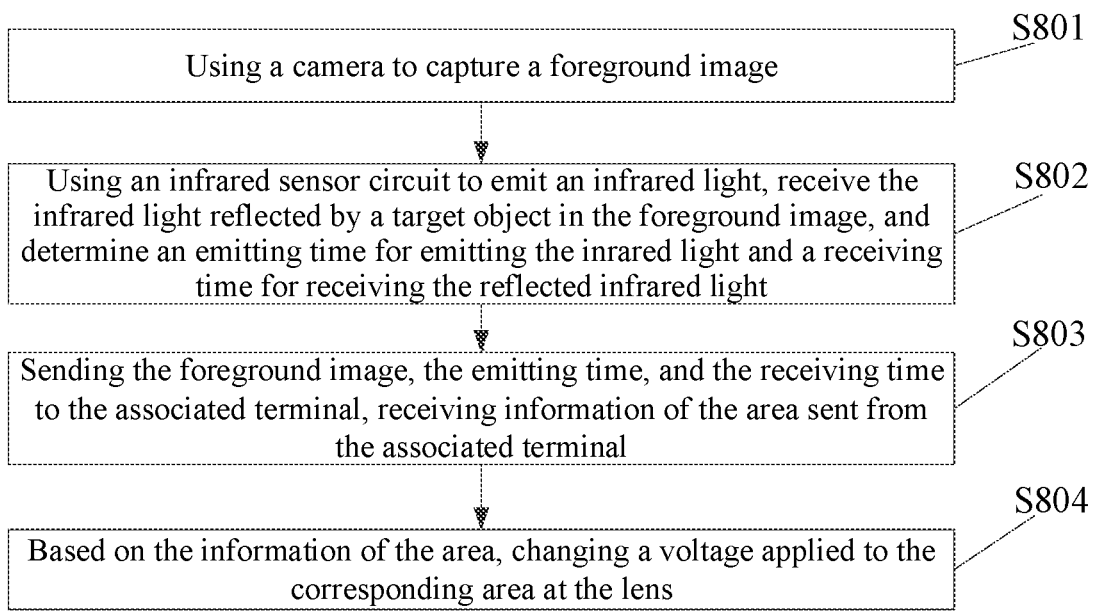
FIG. 8 illustrates another flowchart of an example of an image processing method according to some embodiments of the present disclosure.

Referring to FIG. 8, at S801, the foreground image is captured by the camera.

At S802, the infrared sensor circuit emits the infrared light, and receives the infrared light reflected by the target object in the foreground image, and determines the emitting time for emitting the infrared light and the receiving time for receiving the infrared light.

At S803, the foreground image, the emitting time, and the receiving time are sent to a terminal associated with the glasses, and the information of the area sent from the associated terminal is received.

At S804, based on the information of the area, a voltage applied to the corresponding area at the lens is changed.

It should be noted that the image processing method provided by the foregoing embodiments shares the same concept as those of the various embodiments of the glasses. The implementation details are similar to those of the embodiments of the glasses, and are not repeated herein.

The present disclosure also provides another image processing method. The image processing method includes the following process.

Figure 9:
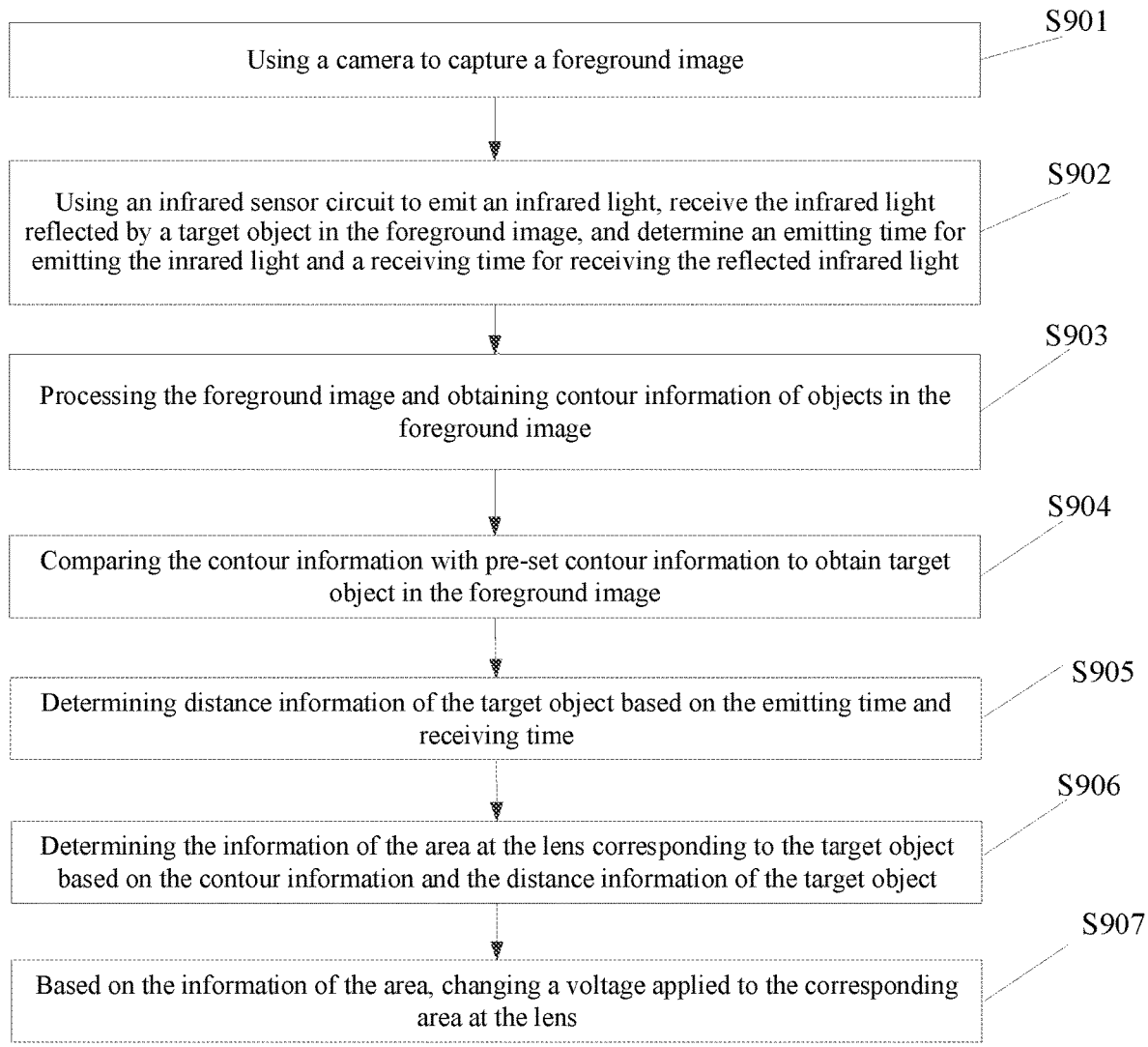
FIG. 9 illustrates another flowchart of an example of an image processing method according to some embodiments of the present disclosure.

Referring to FIG. 9, at S901, the foreground image is captured by the camera.

At S902, the infrared sensor circuit emits the infrared light, and receives the infrared light reflected by the target object in the foreground image, and determines the emitting time for emitting the infrared light and the receiving time for receiving the infrared light.

At S903, the foreground image is processed to obtain contour information of objects in the foreground image.

At S904, the contour information of the objects in the foreground image is compared with pre-set contour information to obtain the target object in the foreground image.

At S905, the emitting time and the receiving time are used to determine distance information of the target object.

At S906, the contour information and the distance information of the target object are used to determine the information of the area at the lens corresponding to the target object.

At S907, based on the information of the area, a voltage applied to the corresponding area at the lens is changed.

It should be noted that the image processing method provided by the foregoing embodiments shares the same concept as those of the various embodiments of the glasses. The implementation details are similar to those of the embodiments of the glasses, and are not repeated herein.

The present disclosure also provides another image processing method. The image processing method includes the following process.

Figure 10:
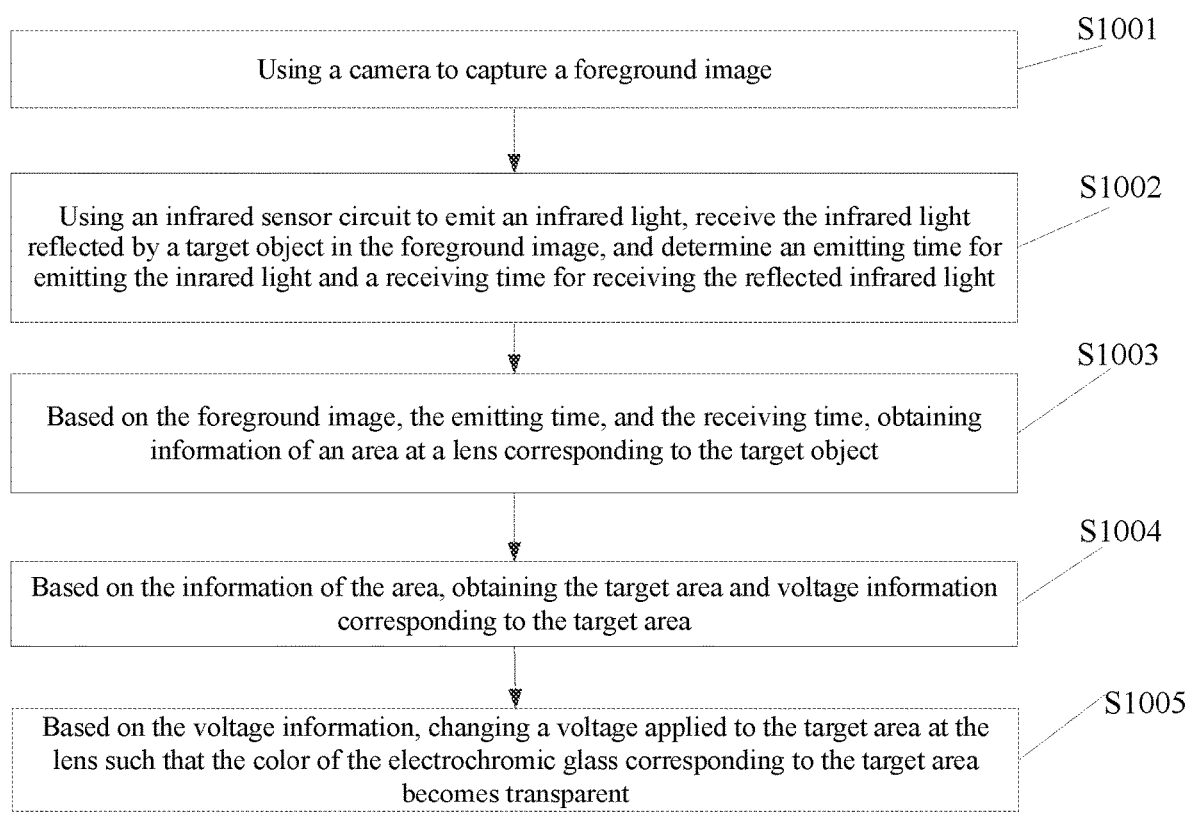
FIG. 10 illustrates another flowchart of an example of an image processing method according to some embodiments of the present disclosure.

Referring to FIG. 10, at S1001, the foreground image is captured by the camera.

At S1002, the infrared sensor circuit emits the infrared light, and receives the infrared light reflected by the target object in the foreground image, and determines the emitting time for emitting the infrared light and the receiving time for receiving the infrared light.

At S1003, based on the foreground image, the emitting time, and the receiving time, the information of the area at the lens corresponding to the target object is obtained.

At S1004, based on the information of the area, a target area and voltage information corresponding to the target area are obtained.

At S1005, based on the voltage information, the voltage applied to the target area at the lens is changed, such that the color of the electrochromic glass corresponding to the target area becomes transparent.

It should be noted that the image processing method provided by the foregoing embodiments shares the same concept as those of the embodiments of the glasses. The implementation details are similar to those of the embodiments of the glasses, and are not repeated herein.

The present disclosure also provides another image processing method. The image processing method includes the following process.

Figure 11:
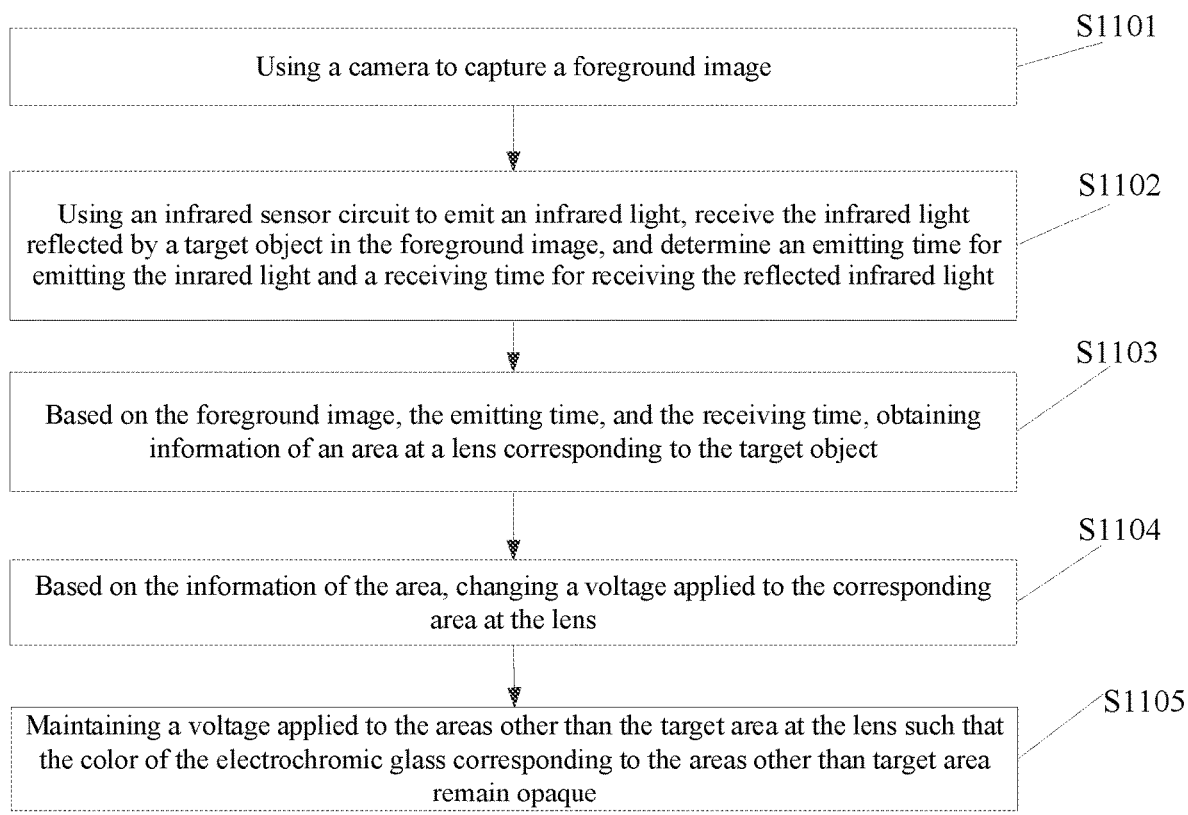
FIG. 11 illustrates another flowchart of an example of an image processing method according to some embodiments of the present disclosure.

Referring to FIG. 11, at S1101, the foreground image is captured by the camera.

At S1102, the infrared sensor circuit emits the infrared light, and receives the infrared light reflected by the target object in the foreground image, and determines the emitting time for emitting the infrared light and the receiving time for receiving the infrared light.

At S1103, based on the foreground image, the emitting time, and the receiving time, the information of the area at the lens corresponding to the target object is obtained.

At S1104, based on the information of the area, the voltage applied to the corresponding area at the lens is changed.

At S1105, the voltages applied to the areas other than the target area at the lens remain unchanged, such that the colors of the electrochromic glass correspond to the areas other than the target area remain opaque.

It should be noted that the image processing method provided by the foregoing embodiments shares the same concept as those of the embodiments of the glasses. The implementation details are similar to those of the embodiments of the glasses, and are not repeated herein.

Figure 12:
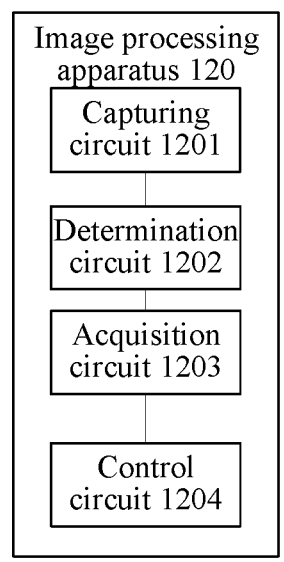
FIG. 12 illustrates a structural diagram of an image processing apparatus according to some embodiments of the present disclosure.

The present disclosure also provides an image processing apparatus. FIG. 12 illustrates a structural diagram of an image processing apparatus according to some embodiments of the present disclosure. As shown in FIG. 12, the image processing apparatus 120 includes: a capturing circuit 1201 configured to use a camera to capture a foreground image; a determination circuit 1202 configured to use an infrared sensor circuit to emit an infrared light, receive the infrared light reflected by a target object in the foreground image, and determine an emitting time for emitting the infrared light and a receiving time for receiving the reflected infrared light; an acquisition circuit 1203 configured to obtain information of an area at a lens corresponding to the target object based on the foreground image, the emitting time, and the receiving time; and a control circuit 1204 configured to control a change of a voltage applied to the corresponding area at the lens based on the information of the area.

In some embodiments, the acquisition circuit 1203 includes: a first transmitting sub-circuit configured to send the foreground image, the emitting time, and the receiving time to a terminal associated with the glasses and a first receiving sub-circuit configured to receive the information of the area sent from the associated terminal.

In some embodiments, the acquisition circuit 1203 includes: a first determination sub-circuit configured to process the foreground image to obtain contour information of objects in the foreground image; a comparison sub-circuit configured to compare the contour information of the objects in the foreground image with pre-set contour information to obtain the target object in the foreground image; a second determination sub-circuit configured to determine distance information of the target object based on the emitting time and the receiving time; and a third determination sub-circuit configured to determine the information of the area at the lens corresponding to the target object based on the contour information and the distance information of the target object.

In some embodiments, the control circuit 1204 includes an acquisition sub-circuit configured to obtain a target area and voltage information corresponding to the target area based on the information of the area and a changing sub-circuit configured to change the voltage applied to the target area based on the voltage information, such that a color of the electrochromic glass corresponding to the target area becomes transparent.

In some embodiments, the control circuit 1204 is further configured to control the voltages applied to areas at the lens other than the target area to remain unchanged, such that the color of the electrochromic glass corresponding to the areas at the lens other than the target area remains unchanged.

It should be noted that the image processing performed by the image processing apparatus provided by the embodiments of the present disclosure is described according to the partitions of the foregoing function circuits or program modules. In practical applications, the image processing may be allocated to different function circuits or program modules according to the actual needs. That is, the internal structure of the apparatus can be divided into different function circuits or program modules to implement all or part of the above described image processing. In addition, the image processing apparatus and the image processing method share the same concept. Implementation details of the image processing apparatus refer to the embodiments of the image processing method, and are not repeated herein.

In some embodiments, the present disclosure also provides a computer storage medium or more specifically, a computer-readable storage medium, including a memory for storing a computer program. The computer program is executed by a processor to implement the foregoing method. The computer-readable storage medium may be a ferroelectric random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disk, or a compact disk read-only memory (CD-ROM).

The present disclosure also provides the computer-readable storage medium for storing the computer program. The computer program is executed by the processor to implement the image processing method provided in the embodiments of the present disclosure.

It should be noted that the description of the embodiments of the computer-readable storage medium is similar to the description of the embodiments of the image processing method, includes the same beneficial effects, and will not be repeated herein. For technical details not described in the embodiments of the image processing apparatus, those skilled in the art may refer to the description of the embodiments of the image processing method. For brevity, the details are not repeated herein.

Those skilled in the art should understand that the other configurations and functions of the battery and battery production methods are well known. For brevity, details are not repeated herein.

In the specification of the present disclosure, descriptions with reference to the terms "one embodiment," "some embodiments," "examples," "specific examples," or "some examples," etc. mean that specific features, structures, materials, or characteristics described in the embodiments or examples are included in at least one embodiment or example of the present disclosure. In the specification, the above terms are not intended to refer to a same embodiment or example. Moreover, the described specific features, structures, material, or characteristics may be combined in any suitable manner in one or more embodiments or examples.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Therefore, a true scope and spirit of the invention is indicated by the following claims.

What is claimed is:

1. A pair of glasses, comprising:
   a lens made of electrochromic glass;
   a camera for capturing a foreground image;
   an infrared sensor circuit for emitting an infrared light, receiving the infrared light reflected by a target object in the foreground image, and determining an emitting time for emitting the infrared light and a receiving time for receiving the reflected infrared light; and
   a processing circuit configured to:
   obtain contour information of the target object in the foreground image;
   based on the emitting time and the receiving time, determine distance information of the target object in real world;
   determine area information at the lens corresponding to the target object based on the contour information and the distance information of the target object;
   based on the area information, obtaining a target area and voltage information corresponding to the target area, the target area being in a location at the lens corresponding to the target object;
   based on the voltage information, changing a voltage applied to the target area to cause a color of a portion of the electrochromic glass in the target area to become transparent; and
   maintaining a voltage applied to a non-target area at the lens outside the target area to keep a color of a portion of the electrochromic glass in the non-target area opaque.

2. The glasses according to claim 1, wherein the processing circuit includes:
   a communication circuit for sending the foreground image, the emitting time, and the receiving time to a terminal associated with the glasses and receiving the area information sent from the associated terminal.

3. The glasses according to claim 1, wherein the processing circuit includes a processor configured to:
   process the foreground image to obtain the contour information of objects in the foreground image; and
   compare the contour information of the objects in the foreground image with pre-set contour information to obtain the target object in the foreground image.

4. The glasses according to claim 1, wherein:
   the lens includes a plurality of partitions, and for one partition of the plurality of partitions:

in response to a voltage applied to the one partition remaining unchanged, a color of a portion of the electrochromic glass of the one partition remains unchanged;

in response to the voltage applied to the one partition changing for more than a pre-set threshold, the color of the portion of the electrochromic glass of the one partition becomes transparent; and in response to the voltage applied to the one partition changing for less than or equal to the pre-set threshold, the color of the portion of the electrochromic glass of the one partition remains opaque.

5. The glasses according to claim 1, further comprising:
a battery configured to:
supply the voltage to the non-target area, such that the voltage applied to the non-target area remains unchanged.

6. An image processing method used by a VR device, comprising:

capturing, by a camera of the VR device, a foreground image;

emitting, by an infrared sensor circuit of the VR device, an infrared light, receiving the infrared light reflected by a target object in the foreground image, and determining an emitting time for emitting the infrared light and a receiving time for receiving the reflected infrared light;

obtaining contour information of the target object in the foreground image;

based on the emitting time and the receiving time, determining distance information of the target object in real world;

determining area information at a lens of the VR device corresponding to the target object based on the contour information and the distance information of the target object, the lens being made of electrochromic glass;

based on the area information, obtaining a target area and voltage information corresponding to the target area, the target area being in a location at the lens corresponding to the target object;

based on the voltage information, changing a voltage applied to the target area to cause a color of a portion of the electrochromic glass in the target area to become transparent; and maintaining a voltage applied to a non-target area at the lens outside the target area to keep a color of a portion of the electrochromic glass in the non-target area opaque.

7. The method according to claim 6, wherein obtaining the area information at the lens of the VR device corresponding to the target object based on the foreground image, the emitting time, and the receiving time includes:

sending the foreground image, the emitting time, and the receiving time to a terminal associated with the VR device; and receiving the area information sent from the associated terminal.

8. The method according to claim 6, wherein obtaining the contour information of the target object in the foreground image includes:

processing the foreground image to obtain the contour information of objects in the foreground image; and comparing the contour information of the objects in the foreground image with pre-set contour information to obtain the target object in the foreground image.

9. A virtual reality (VR) device, comprising:
a lens made of electrochromic glass;

a camera for capturing a foreground image;

an infrared sensor circuit for emitting an infrared light, receiving the infrared light reflected by a target object in the foreground image, and determining an emitting time for emitting the infrared light and a receiving time for receiving the reflected infrared light; and a processing circuit configured to:

obtain contour information of the target object in the foreground image;

based on the emitting time and the receiving time, determine distance information of the target object in real world;

determine area information at the lens corresponding to the target object based on the contour information and the distance information of the target object;

based on the area information, obtaining a target area and voltage information corresponding to the target area, the target area being in a location at the lens corresponding to the target object;

based on the voltage information, changing a voltage applied to the target area to cause a color of a portion of the electrochromic glass in the target area to become transparent; and maintaining a voltages applied to a non-target area at the lens outside the target area to keep a color of a portion of the electrochromic glass in the non-target area opaque.

10. The VR device according to claim 9, wherein the processing circuit includes:

a communication circuit for sending the foreground image, the emitting time, and the receiving time to a terminal associated with the AR device and receiving the area information sent from the associated terminal.

11. The VR device according to claim 9, wherein the processing circuit includes a processor configured to:

process the foreground image to obtain the contour information of objects in the foreground image; and compare the contour information of the objects in the foreground image with pre-set contour information to obtain the target object in the foreground image.

12. The VR device according to claim 9, wherein:

the lens includes a plurality of partitions, and for one partition of the plurality of partitions:

in response to a voltage applied to the one partition remaining unchanged, a color of a portion of the electrochromic glass of the one partition remains unchanged;

in response to the voltage applied to the one partition changing more than a pre-set threshold, the color of the portion of the electrochromic glass of the one partition becomes transparent; and in response to the voltage applied to the one partition changing for less than or equal to the pre-set threshold, the color of the portion of the electrochromic glass of the one partition remains opaque.

13. The VR device according to claim 9, further comprising:

a battery configured to:

supply the voltage to the non-target area, such that the voltage applied to the non-target area remains unchanged.

* * * * *